(12) United States Patent
Burke et al.

(10) Patent No.: US 7,035,346 B1
(45) Date of Patent: Apr. 25, 2006

(54) METHOD AND APPARATUS FOR DESENSITIZATION OF A WIRELESS RECEIVER

(75) Inventors: Michael Eugene Burke, Morris Plains, NJ (US); Joseph Thaddeus Lipowski, Boxborough, MA (US); Leonard Edward O'Boyle, Oceanport, NJ (US); Rulon G. Van Dyke, Parsippany, NJ (US); Jack Chi-Chieh Wen, Parsippany Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/100,569

(22) Filed: Jun. 19, 1998

(51) Int. Cl.
*H04L 27/06* (2006.01)

(52) U.S. Cl. .................. 375/316; 375/219; 375/316; 330/10; 370/332; 455/67.1

(58) Field of Classification Search ............. 455/126, 455/127, 236.1, 249.1, 280, 254, 67.1; 375/345, 375/316, 332, 219, 271, 136, 130, 256; 370/332; 330/10
See application file for complete search history.

(56) References Cited

U.S. PATENT DOCUMENTS

| | | | | | |
|---|---|---|---|---|---|
| 4,270,222 A | * | 5/1981 | Menant | ..... | 455/236.1 |
| 5,303,411 A | * | 4/1994 | Stengel et al. | ..... | 455/254 |
| 5,475,870 A | * | 12/1995 | Weaver, Jr. et al. | ..... | 455/67.1 |
| 5,483,557 A | * | 1/1996 | Webb | ..... | 375/349 |
| 5,519,888 A | * | 5/1996 | Hall et al. | ..... | 455/249.1 |
| 5,584,049 A | | 12/1996 | Weaver, Jr. et al. | ..... | 455/67.1 |
| 5,617,240 A | * | 4/1997 | Hergault et al. | ..... | 330/10 |
| 5,675,581 A | * | 10/1997 | Soliman | ..... | 370/252 |
| 5,715,526 A | | 2/1998 | Weaver, Jr. et al. | ..... | 455/126 |
| 6,191,652 B1 | * | 2/2001 | Gentzier | ..... | 330/52 |
| 6,304,561 B1 | * | 10/2001 | Jin et al. | ..... | 370/332 |

* cited by examiner

*Primary Examiner*—Shuwang Liu

(57) ABSTRACT

A receiver desensitization system sets the sensitivity of a receiver by injecting a desensitization signal appearing as noise onto a receive path of the receiver to adjust the noise power level relative to the power level of signals on the receive path. For example, a desensitization source provides a desensitization signal appearing as noise onto a desensitization path. An adjustable attenuator on the desensitization path adjusts the power level of the desensitization signal to provide a desired level of desensitization. The desensitization path is coupled to a receive path of a receiver, and the desensitization signal is injected into the receive path. The desensitization signal desensitizes the receiver by raising the noise power level relative to the signal power level on the receive path. The desensitization signal can be injecting into the receive path after a main amplifier on the receive path. By injecting the desensitization signal after the amplifier, the desensitization system reduces the contribution to the overall noise figure that would occur if any attenuation of the signal were to occur before the input to the amplifier. Depending on the application, the desensitization signal can be injected into the receive path at the radio frequency (RF), intermediate frequency (IF) or baseband stages of the receiver. The desensitization signal can take a variety of forms, such as broadband noise, a continuous wave signal, a modulated signal, or a digital pseudo-random noise sequence.

17 Claims, 3 Drawing Sheets

METHOD AND APPARATUS FOR DESENSITIZATION OF A WIRELESS RECEIVER

BACKGROUND OF THE INVENTION

1. Field of the Invention

The present invention relates to wireless communications and, more particularly, to the desensitization of a wireless receiver.

2. Description of the Related Art

In many cellular and personal communication systems, the power levels transmitted by every mobile unit is under the control of the serving base stations. Power control over the mobile units is done so that the mobile units transmit at the lowest power level necessary to maintain a good quality link on the reverse channel (from the mobile unit to the base station). Power control helps prolong battery life for the mobile unit and reduces the reverse channel signal to noise ratio (S/N) subscriber unit. In certain situations, it may be advantageous to reduce the sensitivity for a wireless receiver at the base station to achieve an appropriate level of transmit power from the mobile unit. For example, where the transmit power of a mobile unit is intentionally kept high to overcome potential interferers, it may be desirable to desensitize the base station, so the base station believes that the mobile is farther away than it really is. As such, the base station will transmit to the mobile unit power control information maintaining a high transmit power for the mobile unit. Desensitization may also be important when the mobile unit is receiving power control information from two or more base stations. In code division multiple access (CDMA) systems where a small coverage area (microcell) is embedded within a larger cell (macrocell) and the mobile unit is in soft handoff (in that the mobile unit is simultaneously communicating with the microcell and the macrocell), the base station receivers of both cells may be sending conflicting power control information to the mobile unit. For example, if the microcell is too sensitive, the microcell base station may transmit power control information to the mobile unit directing the mobile unit to transmit at a low power level. While transmitting at the low power level, the mobile unit may satisfy the microcell base station, but the low power level will be insufficient for the macrocell base station. In response, the base station for the macrocell will transmit power control information directing the mobile unit to transmit at a higher power level which is not acceptable to the microcell base station. Therefore, it is necessary to desensitize the microcell so that the transmitted power level of the mobile unit at the handoff boundary is sufficiently high to both the microcell as well as to the macrocell, thereby achieving an appropriate sensitivity balance between the different base stations.

FIG. 1 shows a manner in which desensitization is implemented in the front-end of a wireless receiver 10. The receiver 10 includes an attenuator 12 or other lossy device which is connected prior to the input of a low noise amplifier 14. The attenuator 12 can be adjustable to provide variable desensitization levels. The attenuator 12 provides desensitization by reducing or attenuating the signal power level while the noise power level remains at the same level. Depending on the desired level of desensitization, the amount of attenuation of the received signal is set accordingly. By reducing the signal power level while maintaining the noise level, the S/N ratio for the receiver is reduced and thereby the sensitivity of the receiver is reduced. The disadvantage of setting the sensitivity of the receiver in this manner, however, is that variable attenuator is on the receive path 15 and always incurs some insertion loss. This loss can be as much as a few decibels (dB) and may sometimes be a significant contributor to the overall noise figure of the receiver 10. Accordingly, a need exists for a desensitization system for setting the sensitivity of a wireless receiver that reduces the drawbacks of previous systems.

SUMMARY OF THE INVENTION

The present invention sets the sensitivity of a receiver by injecting a desensitization signal, such as a noise signal, onto a receive path of the receiver to adjust the noise power level relative to the power level of signals on the receive path. For example, a desensitization source provides a desensitization signal appearing as noise onto a desensitization path. An adjustable attenuator on the desensitization path adjusts the power level of the desensitization signal to provide a desired level of desensitization. The desensitization path is coupled to a receive path of a receiver, and the desensitization signal is injected into the receive path. The desensitization signal desensitizes the receiver by raising the noise power level relative to the signal power level on the receive path. The desensitization signal can be injected into the receive path after a main amplifier on the receive path. By injecting the desensitization signal after the amplifier, the desensitization system reduces the contribution to the overall noise figure that would occur if any attenuation of the signal were to occur before the input to the amplifier, allowing the receiver to have no loss in sensitivity in cases where desensitization is not desired. Depending on the application, the desensitization signal can be injected into the receive path at the radio frequency (RF), intermediate frequency (IF) or baseband stages of the receiver. The desensitization signal can take a variety of forms, such as broadband noise, a continuous wave signal, a modulated signal, or a digital pseudo-random noise sequence.

BRIEF DESCRIPTION OF THE DRAWING

Other aspects and advantages of the present invention may become apparent upon reading the following detailed description and upon reference to the drawings in which.

DETAILED DESCRIPTION

Illustrative embodiments of the desensitization system according to the principles of the present invention for a wireless receiver are described below as the desensitization system might be implemented to set the sensitivity of a wireless receiver by desensitizing the wireless receiver. The receiver desensitization system accomplishes this by injecting a desensitization signal within the operating bandwidth of the received signal onto the receive path of a wireless receiver. Rather than attenuating the received signal on the receive path down to the noise level, the desensitization signal effectively raises the noise power level on the receive path toward the power level of the received signal, thereby desensitizing the receiver. The wireless receiver can be any receiver where desensitization is desired, such as the mobile unit or base station receivers, and the receiver can implement any multiple access scheme, such as code-division multiple access (CDMA), time division multiple access (TDMA), Advanced Mobile Phone System (AMPS), Global System for Mobile Communication (GSM). In a system with multiple carriers (and receivers), all the carriers can be simultaneously desensitized by one noise source of sufficient bandwidth.

Figure 1:
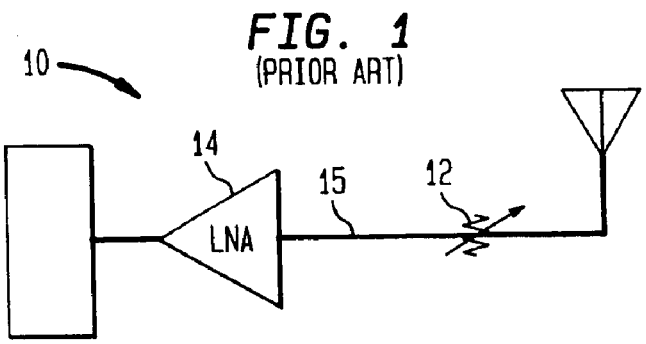
FIG. 1 is a diagram showing how receiver desensitization is performed in the prior art.
Figure 2:
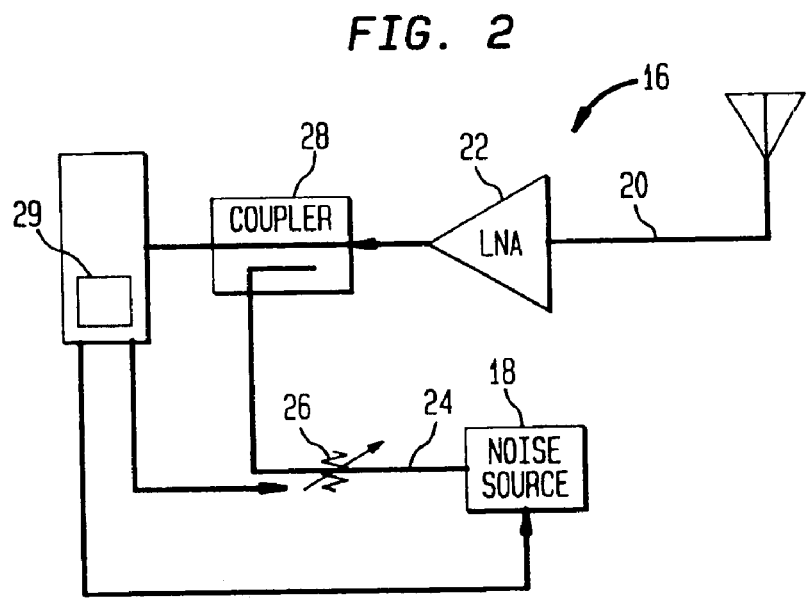
FIG. 2 shows an embodiment of the receiver desensitization system according to the principles of the present invention in which broadband noise is injected into the receive path of the receiver.

FIG. 2 shows a diagram of the front end 16 of a wireless receiver using an embodiment of the receiver desensitization system according to the principles of the present invention. A broadband noise source 18, such as a noise diode, is used to inject a desensitization signal onto a receive path 20 at a point after the output of a low noise amplifier (LNA) 22. In this particular embodiment, the noise source 18 is on a desensitization path 24, and an adjustable attenuator 26 on the desensitization path 24 variably attenuates the noise on the desensitization path 24. A coupler 28 on the receive path 20 receives as an input the desensitization path and injects the desensitization signal into the receive path 20 to desensitize the receiver using the broadband noise from the noise source 18. The variable attenuator 26 provides the ability to adjust the amount of noise power to be injected into the receive path 20. As such, this embodiment provides different levels of desensitization. The power level of the desensitization signal, however, should be slightly less than or greater than the amplified noise power level from the LNA 22 or other components preceding the coupler 28. As the power level of the desensitization signal approaches or exceeds the amplified noise power level, the desensitization signal contributes more to the overall combined noise figure, so desensitization can be realized.

In certain applications, control circuitry 29 can dynamically adjust the desensitization level depending upon a variety of parameters, including the frame error rate (FER) and/or the bit error rate (BER) per received signal power level. In this context, dynamically adjust means that the control circuitry 29 can send a control signal to trigger an adjustment based on changing system operating parameters. The BER, FER and/or corresponding received signal level at base stations with overlapping coverage, nearby base stations and/or base stations in soft handoff with a mobile can be to examined to determine the desired desensitization level. For example, for a particular received power level, the system is designed to provide a particular FER, so the control circuitry 29 adjusts the adjustable attenuator 36 to provide the desired level of desensitization. The level of desensitization may be changed due to a change in the operating environment; for example, a building may be built next to the base station, a change in the cellular configuration, or a change in capacity.

Figure 3:
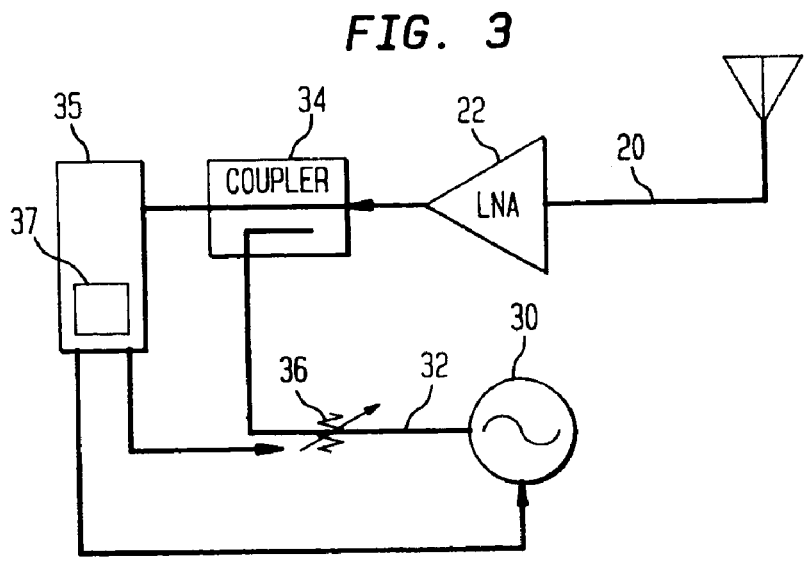
FIG. 3 shows an embodiment of the receiver desensitization system according to the principles of the present invention in which a continuous wave (CW) signal is injected into the receive path of the receiver.

FIG. 3 shows another embodiment of a receiver desensitization system according to the principles of the present invention. In this particular embodiment, rather than using the broadband signal source 18 of FIG. 2, an oscillator 30 produces a continuous wave (CW) signal as the desensitization signal on a desensitization path 32. As with the embodiment of FIG. 2, the power level of the desensitization signal injected into the receive path 20 increases the power level of the noise as the power level of the desensitization signal approaches the noise power level preceding the coupler 34. This particular embodiment is well suited for a spread spectrum receiver, such as a direct sequence spread spectrum code division multiple access (CDMA) system. Spread spectrum receivers frequency spread interfering signals, such as the CW desensitization signal, into the noise while despreading the desired spread spectrum signal. As such, when the interfering signal is spread while the desired signal is despread, the resulting signal appears to be noise in the presence of the desired despread signal.

In this particular embodiment, a coupler 34 on the receive path 20 injects the CW desensitization signal into the receive path 20 to appear like a despread interfering signal in the presence of the desired spread spectrum signal. Further along the receive path 20, the remainder of the spread spectrum receiver 35 spreads the CW desensitization signal while despreading the desired spread spectrum signal. As such, the spread desensitization signal appears like noise in the presence of the desired despread signal. The higher the CW desensitization signal power, the higher the "noise" power level of the spread CW desensitization signal. With this effect, by adjusting the CW signal power level, the level of desensitization can be varied. In this particular embodiment, an adjustable attenuator 36 adjusts the level of the CW signal on the desensitization path 32. Depending on the desired system performance, the desensitization level can be set according to the power level of the desensitization signal. For example, in certain base station applications, the frame error rate (FER) and/or the bit error rate (BER) per received signal power level can be examined to determine the desired desensitization level. The BER, FER and/or corresponding received signal levels at base stations with overlapping coverage, nearby base stations and/or base stations in soft handoff with a mobile can be examined to determine the desired desensitization level. In certain applications as mentioned above, control circuitry 37 can dynamically adjust the desensitization level depending upon one, some or all of the above parameters. Additionally, the control circuitry 37 could also dynamically adjust the CW signal injection source 30, for example, to change the CW frequency of the desensitization signal.

Figure 4:
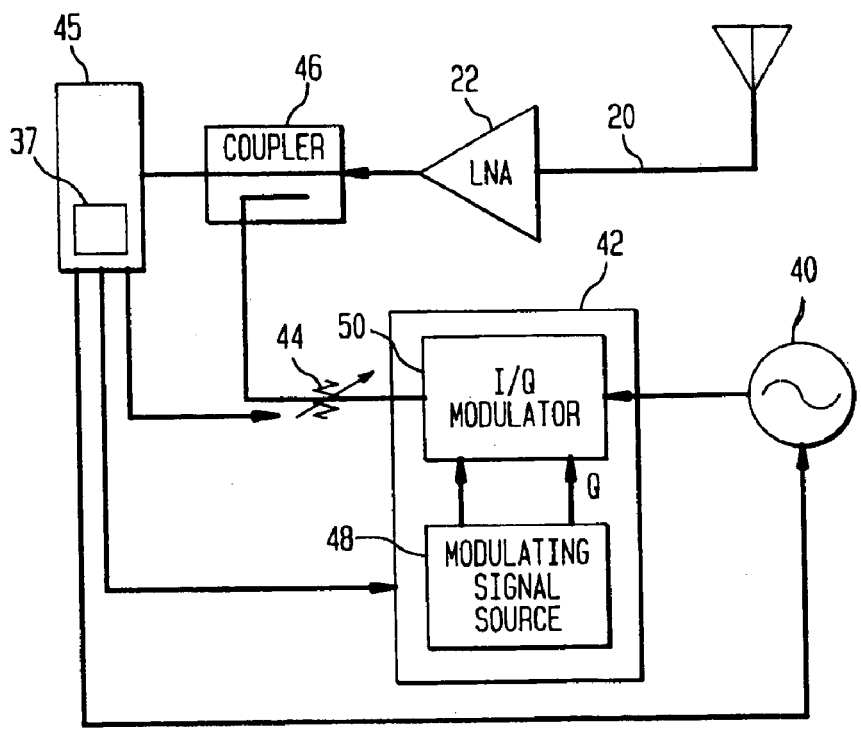
FIG. 4 shows an embodiment of the receiver desensitization system according to the principles of the present invention in which a I/Q modulated signal is injected into the receive path of the receiver.
Figure 5:
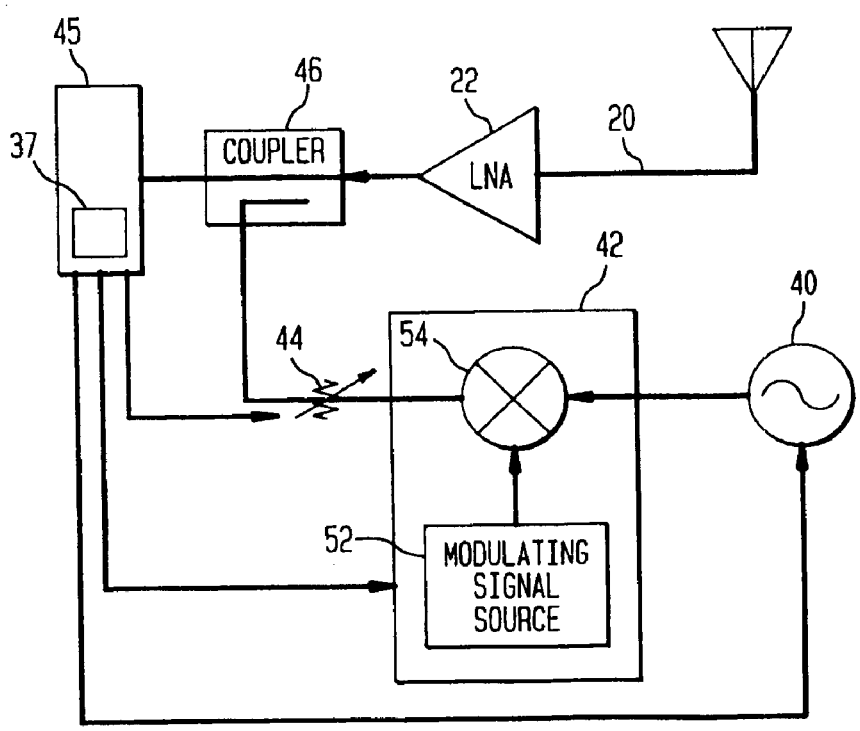
FIG. 5 shows an embodiment of the receiver desensitization system according to the principles of the present invention in which a mixer modulated signal is injected into the receive path of the receiver.
Figure 6:
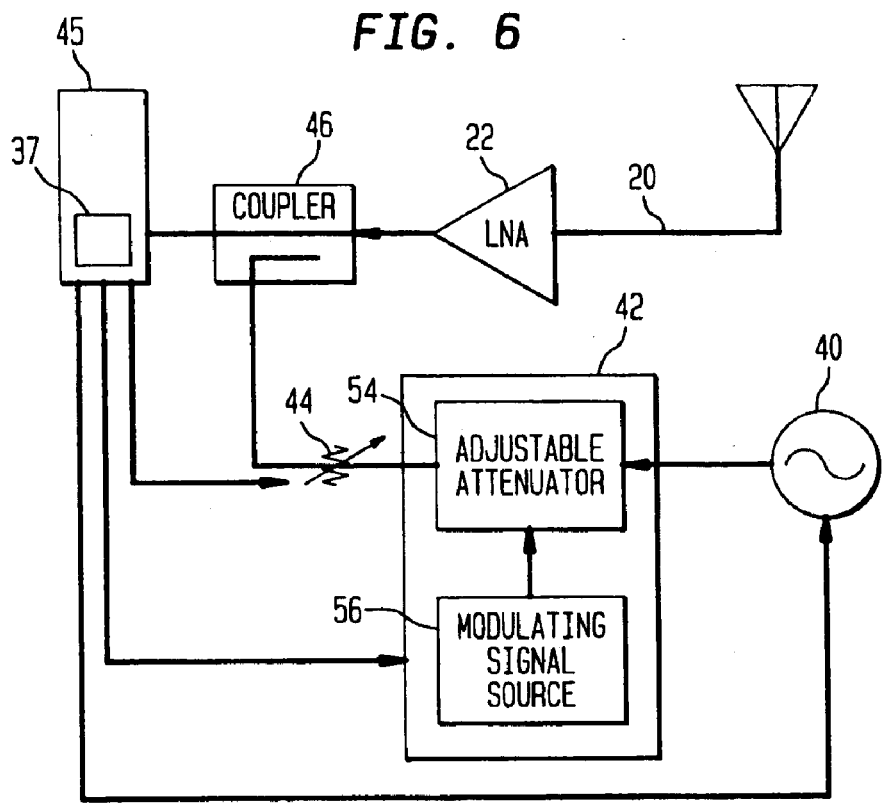
FIG. 6 shows an embodiment of the receiver desensitization system according to the principles of the present invention in which an attenuator modulated signal is injected into the receive path of the receiver.

FIGS. 4, 5 and 6 show embodiments of the receiver desensitization system. In these embodiments, a CW source 40, such as an oscillator, produces a CW signal which is modulated by a modulator 42 to provide a wider bandwidth desensitization signal when compared to the narrow CW signal. In other embodiments, the modulator 42 could receive other types of desensitization signals having a varying frequency, multiple frequencies and/or a modulated signal or pseudo-random noise signal to provide different levels of desensitization at different portions of the operating bandwidth of the receiver. A wider bandwidth desensitization signal may be desired in certain applications where narrow bandwidth signals may pose a problem for devices making received signal strength indicator (RSSI) measurements. An adjustable attenuator 44 adjusts the modulated desensitization signal level to provide the desired amount of desensitization, and a coupler 46 injects the modulated desensitization signal into the receive path 20. To provide the wider bandwidth desensitization signal, modulation of the CW signal can be performed in a variety of ways, such as amplitude modulation (AM), frequency modulation (FM), pulse width modulation (PWM), phase modulation (PM), noise or any other form of modulation of the frequency source including combinations of the aforementioned types of modulation.

Noise type modulation can be implemented by using a pseudo-random noise (PN) code sequences to modulate the desensitization signal as would be understood by one of ordinary skill in the art. If such a receiver desensitization system is used in a spread spectrum receiver, the noise-modulated desensitization signal is coupled onto the receive path 20 and appears as noise even after going through the despreading process in the remainder of the receiver 45 because the desensitization signal is not correlated with the received signal. As before, as the power level of the desensitization signal approaches or exceeds the amplified noise power level, the desensitization signal contributes more to the overall combined noise figure, so desensitization can be realized. As before, the level of desensitization increases as the power level of the modulated desensitization signal approaches or exceeds the amplified noise power level on the receive path 20. Alternatively, the adjustable attenuator 44 can adjust the power level of the modulated desensitization signal by adjusting the power level of the desensitization signal source 40 prior to the modulator 42.

The modulator 42 for the embodiments of FIGS. 4, 5 and 6 is shown in a variety of different forms. In the embodiment of FIG. 4, the modulator 42 includes a modulating signal source 48 which provides in-phase (I) and quadrature (Q) signals to an I/Q modulator 46. The I/Q modulator 42 modulates the desensitization signal according to the I and Q signals which reflect the type of modulation being performed on the desensitization signal to produce the modulated desensitization signal. In FIG. 5, the modulator 42 includes a modulating signal source 52, such as a pseudo-random code generator in certain embodiments, which is mixed by a mixer 54 with the CW desensitization signal from the oscillator 40 to produce a noise-modulated desensitization signal. The mixer-modulated desensitization signal may require filtering (not shown) because the mixing process creates different frequency mixed components to emanate from the mixer 54. In the embodiment of FIG. 5, the modulating signal source 52 is being frequency upconverted or downconverted. If frequency upconversion of the modulating signal is desired, then a high pass filter (not shown) can be is used to filter out the lower frequency components. If frequency downconversion of the modulating signal, then a low pass filter (not shown) can be used to filter out the higher frequency components. The adjustable attenuator 44 can adjust the modulated desensitization signal power level or the desensitization signal power level prior to modulation to provide the appropriate level of desensitization.

In FIG. 6, the modulator 42 includes an adjustable attenuator 54 which receives the CW signal from the oscillator 40 and a modulating signal from a modulating signal source 56. The adjustable attenuator 54 modulates the CW signal by attenuating the CW signal in response to the modulating signal. This modulator 42 can be typically characterized as performing AM or PWM. Depending on the particular modulation scheme, the adjustable attenuator 54 modulates the CW signal using the modulating signal to produce an attenuator-modulated desensitization signal.

Thus, the receiver desensitization system effectively desensitizes a receiver without attenuating the desired signal. Instead, the receiver desensitization system provides the desired level of desensitization by adjusting the noise level on the receive path of the receiver. Alternative embodiments of the receiver desensitization system according to the principles of the present invention are possible which add or omit components and/or perform variations and/or combinations of the above-described system. In certain applications of FIGS. 4, 5 and 6, control circuitry 37 can dynamically adjust the desensitization level depending upon various parameters, including those mentioned above. In response to the parameters, the control circuitry 37 can adjust the level of desensitization by controlling the adjustable attenuator 44. Additionally, the control circuitry 37 could also dynamically adjust the desensitization signal source 40, for example, to change the CW frequency of the desensitization signal or dynamically control the modulation of the desensitization signal. Additionally, the above described embodiments are implemented in the RF stage, but embodiments of the receiver desensitization system can also be implemented at the intermediate frequency (IF) and baseband stages as would be understood by one of ordinary skill in the art with the benefit of this disclosure.

Figure 7A:
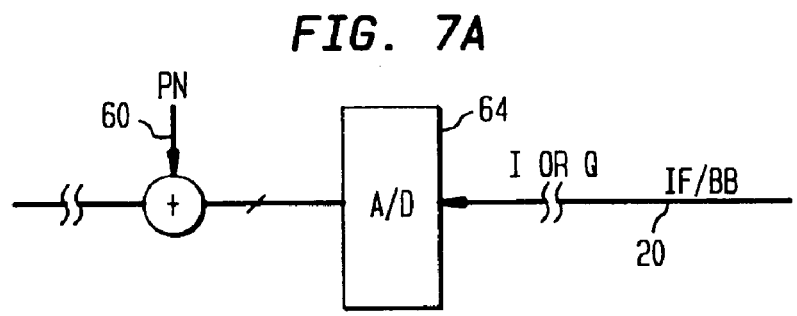
FIG. 7a shows a baseband or intermediate frequency implementation of the desensitition system.

For example, FIG. 7a shows a baseband (BB) or intermediate frequency (IF) implementation of the receiver desensitization system where a digital desensitization signal, such as a digital pseudo-random noise code, on a desensitization path 60 is injected into at least a portion of the receive path 20 in the digital domain to increase the desensitization of the receiver. In this particular embodiment, a summer 62 sums together the digital pseudo-random sequence with the digitized received signal. At this point in the receive path 20, the received signal has typically been demodulated into in-phase (I) and quadrature (Q) components, and depending on the implementation, portions of the receive path 20 can carry I components, Q components or both I and Q components of the received signal. The received signal component(s) at IF or BB on the receive path 20 are analog-to-digitally converted by a analog-to-digital converter (A/D) 64, and the desensitization signal is summed into at least a portion of the digital received signal component(s). The desensitization signal could be added to a subset of the digital lines making up the receive path 20 in the digital domain, depending on the amount of desensitization desired or depending if desensitization is desired for one type of component rather than the other.

Figure 7B:
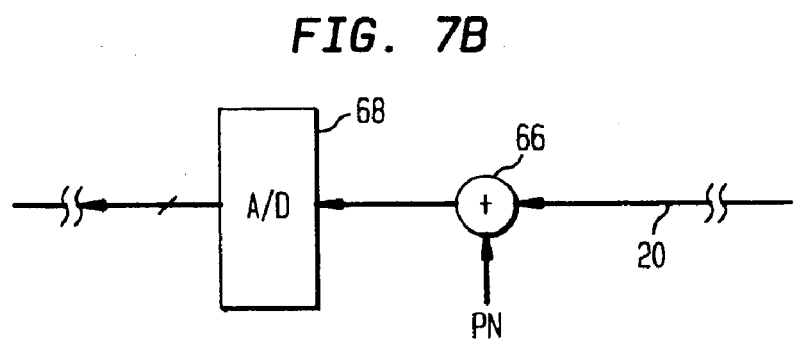
FIG. 7b shows another baseband or intermediate frequency implementation of the desensitition system.

FIG. 7b shows another baseband (BB) or intermediate frequency (IF) implementation of the receiver desensitization system where a desensitization signal, such as a pseudo-random noise code, on a desensitization path 60 is injected into at least a portion of the receive path 20 to increase the desensitization of the receiver. In this particular embodiment, a summer 66 sums together the pseudo-random sequence with the demodulated received signal. Other components such as combiners and couplers can be used as the summer 66. At this point in the receive path 20, the received signal has typically been demodulated into in-phase (I) and quadrature (Q) components, and depending on the implementation, portions of the receive path 20 can carry I components, Q components or both I and Q components of the received signal. The received signal component(s) at IF or BB on the receive path 20 along with the desensitization signal are analog-to-digitally converted by a analog-to-digital converter (A/D) 68 into the digital domain. The level of desensitization in this embodiment can be adjusted by controlling the power level of the pseudo-random noise sequence.

Other alternative embodiments can be used which are encompassed by the principles of the present invention to provide a receiver desensitization system which adjusts the "noise" level on the receive signal path or on portions or branches of the receive path anywhere from baseband to RF or at multiple points along the receive path to provide corresponding levels of desensitization. Additionally, the above described embodiments have been described as injecting the desensitization signal after the output of a low noise amplifier at the front-end of the receive path, but the embodiments are possible in which the desensitization signal is injected anywhere along the receive path of the receiver. A low insertion loss (about 0.5 dB) can be achieved by injecting the desensitization signal onto the receive path after the amplifier using a coupler. Other devices can be used as couplers to inject the desensitization signal into the receive path, such as power combiners and summers.

The receiver desensitization system has been described as being used in the front-end of a wireless receiver and in some embodiments a spread spectrum receiver, but embodiments of the receiver desensitization system can be used with any receiver in which receiver desensitization is desired. For example, the receiver desensitization system can be used in a mobile unit, or in systems using AMPS, TDMA, CDMA, wideband CDMA, frequency division multiple access (FDMA), and Digital European Cordless Telephone (DECT). Additionally, embodiments of the receiver desensitization system can be implemented in coherent or non-coherent receivers and in base stations or mobile stations. The receiver desensitization system according to the principles of the present invention can be implemented utilizing various embodiments of application specific integrated circuit(s), software driven processing circuitry, and/or various arrangements of discrete components. For example, the control circuitry which adjusts the level of desensitization and/or the manner of providing desensitization can be implemented as part of the processing circuitry in the receiver. The control circuitry can respond to various paramerters being monitored by the receiver, the base station and/or a mobile switching center (MSC) connected to the base station. The control circuitry is shown as sending control signals directly to the components of the receiver desensitization system, but the control signals can originate for example at the MSC, pass through the base station to the receiver and to the components. As such, the functions of monitoring parameters for the desensitization circuitry and determining the appropriate level of desensitization for the receiver, and actually performing the adjustment can be performed in different locations. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. In a wireless communication system having a mobile unit and a base station receiver directing the transmitted power level of the mobile unit, a method of receiving a received signal on a receive path of said base station receiver, said method comprising the steps of:

injecting a desensitization signal into said receive path to raise the noise level of said receive path relative to the level of said received signal without attenuating the received signal on said receive path so as to desensitize the base station receiver; and responsive to changes in bit error rate and/or frame error rate for the signal received at the base station from the mobile unit, dynamically adjusting the power level of the desensitization signal based on the said bit error rate and/or said frame error rate.

2. The method of claim 1 further including the step of:

amplifying said received signal on said receive path with an amplifier; and wherein said step of injecting further includes;

injecting said desensitization signal into said receive path after said amplifier.

3. The method of claim 1 further including the step of:

providing a noise source as said desensitization signal.

4. The method of claim 1 further including the step of:

providing a continuous wave signal as said desensitization signal.

5. The method of claim 1 further including the step of:

modulating a continuous wave signal using a modulating signal source to produce a modulated desensitization signal as said desensitization signal.

6. The method of claim 5 wherein said step of modulating including the steps of:

providing said continuous wave signal to an I/Q modulator;

providing I and Q signals from said modulating signal source; and modulating by said I/Q modulator said continuous wave signal using said I and Q signals to produce said modulated desensitization signal.

7. The method of claim 5 wherein said step of modulating including the step of:

mixing said continuous wave signal with a modulating signal from said modulating signal source to produce said modulated desensitization signal.

8. The method of claim 5 wherein said step of modulating including the steps of:

providing said continuous wave signal to an adjustable attenuator;

providing a modulating signal to said adjustable attenuator; and attenuating by said adjustable attenuator said continuous wave signal using said modulating signal to produce said modulated desensitization signal.

9. The method of claim 1 further including the step:

attenuating said desensitization signal prior to said step of injecting.

10. The method of claim 1 wherein said step of injecting further including the step of:

coupling said desensitization signal onto said receive path.

11. In a wireless communication system having a mobile unit, a base station receiver directing the transmitted power level of the mobile unit, said base station receiver having a receive path for receiving a received signal, said base station receiver comprising:

a desensitization signal source that is capable of producing a desensitization signal on a desensitization signal path;

a coupler connected to said desensitization signal path and said receive path and injects said desensitization signal into said receive path to raise the noise level on said receive path relative to the level of said received signal without attenuating the received signal on said receive path so as to desensitize the base station receiver; and responsive to changes in bit error rate and/or frame error rate for the signal received at the base station from the mobile unit, means for dynamically adjusting the power level of the desensitization signal based on said the bit error rate and/or said frame error rate.

12. The receiver of claim 11 wherein said desensitization signal source comprises a noise source producing a noise signal on said desensitization path.

13. The receiver of claim 11 wherein said desensitization signal source comprises a continuous wave signal source producing a continuous wave signal on said desensitization path.

14. The receiver of claim 11 further comprising:

a continuous wave signal source producing a continuous wave signal;

a modulating signal source producing at least one modulating signal; and a modulator receives said continuous wave signal and said at least one modulating signal and modulates said continuous wave signal using said at least one modulating signal to produce a modulated desensitization signal as said desensitization signal.

15. The receiver of claim 11 further comprising:

an attenuator on said desensitization signal path receives and adjusts the level of said desensitization signal on said desensitization signal path.

16. The receiver of claim 11 further comprising:

an amplifier on said receive path; and said coupler located on said receive path after the output of said amplifier.

17. The receiver of claim 11 wherein said received signal on said receive path being in the form of a digitized I/Q signal at a baseband frequency, said desensitization signal source producing a pseudo-random noise sequence as said desensitization signal; and said coupler summing said pseudo-random noise sequence with said digitized I/Q signal to desensitize said receiver.

* * * * *